June 30, 1931.  F. W. HARNEY  1,812,631
FORMING APPARATUS FOR PLASTIC MATERIALS
Filed Oct. 10, 1930   4 Sheets-Sheet 1
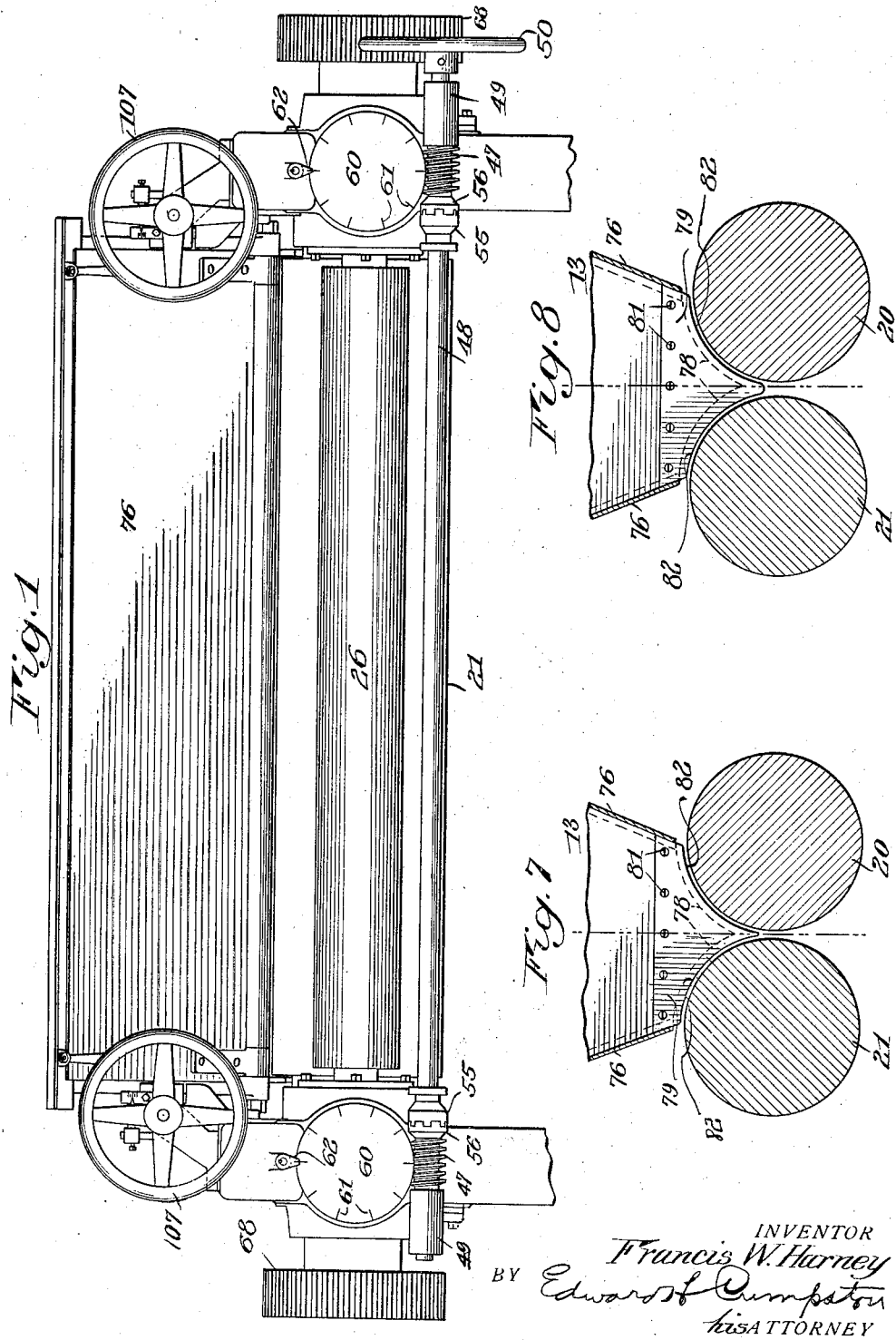
INVENTOR
Francis W. Harney
BY Edward L. Crumpton
his ATTORNEY

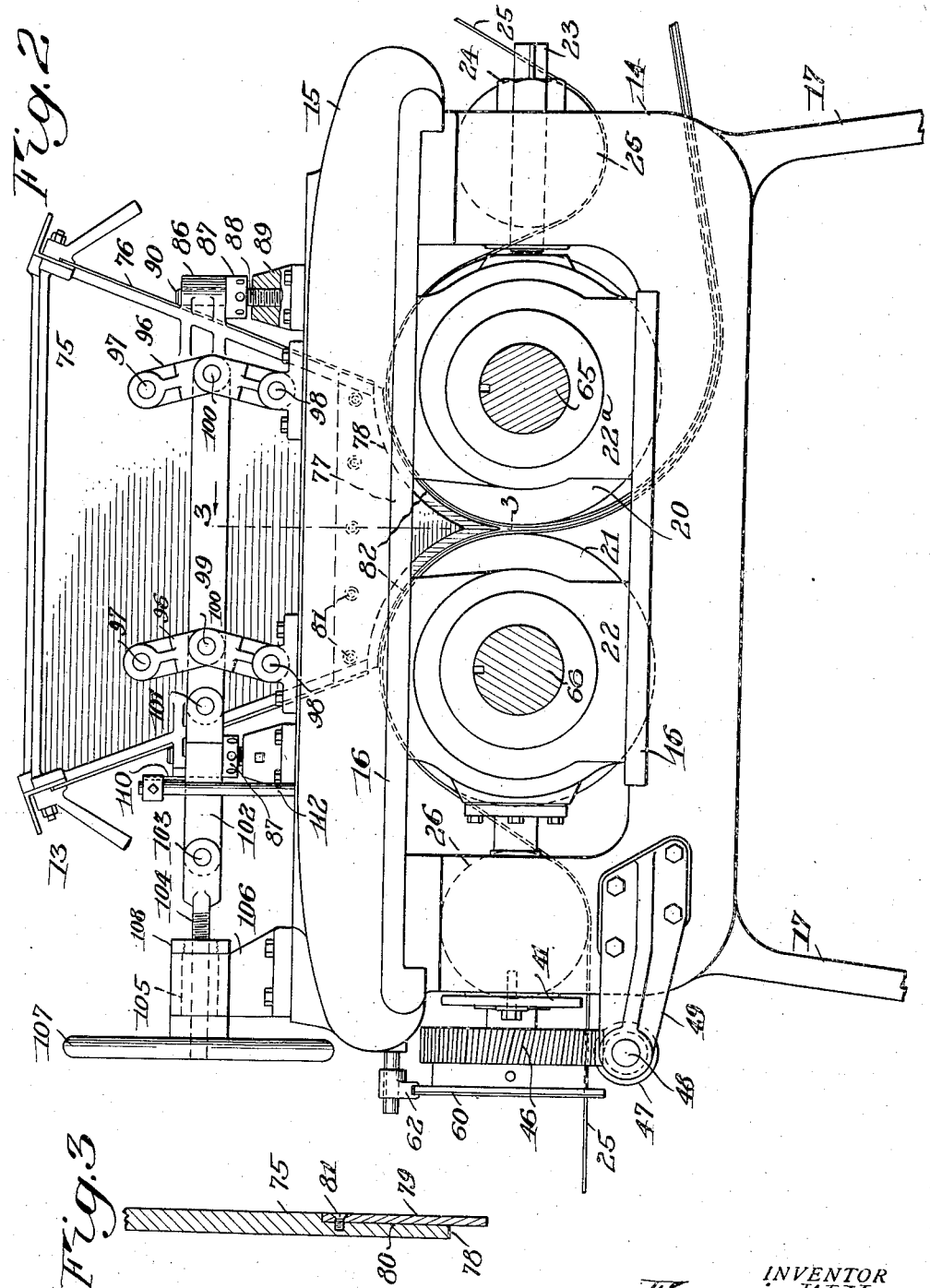

June 30, 1931. F. W. HARNEY 1,812,631
FORMING APPARATUS FOR PLASTIC MATERIALS
Filed Oct. 10, 1930 4 Sheets-Sheet 3
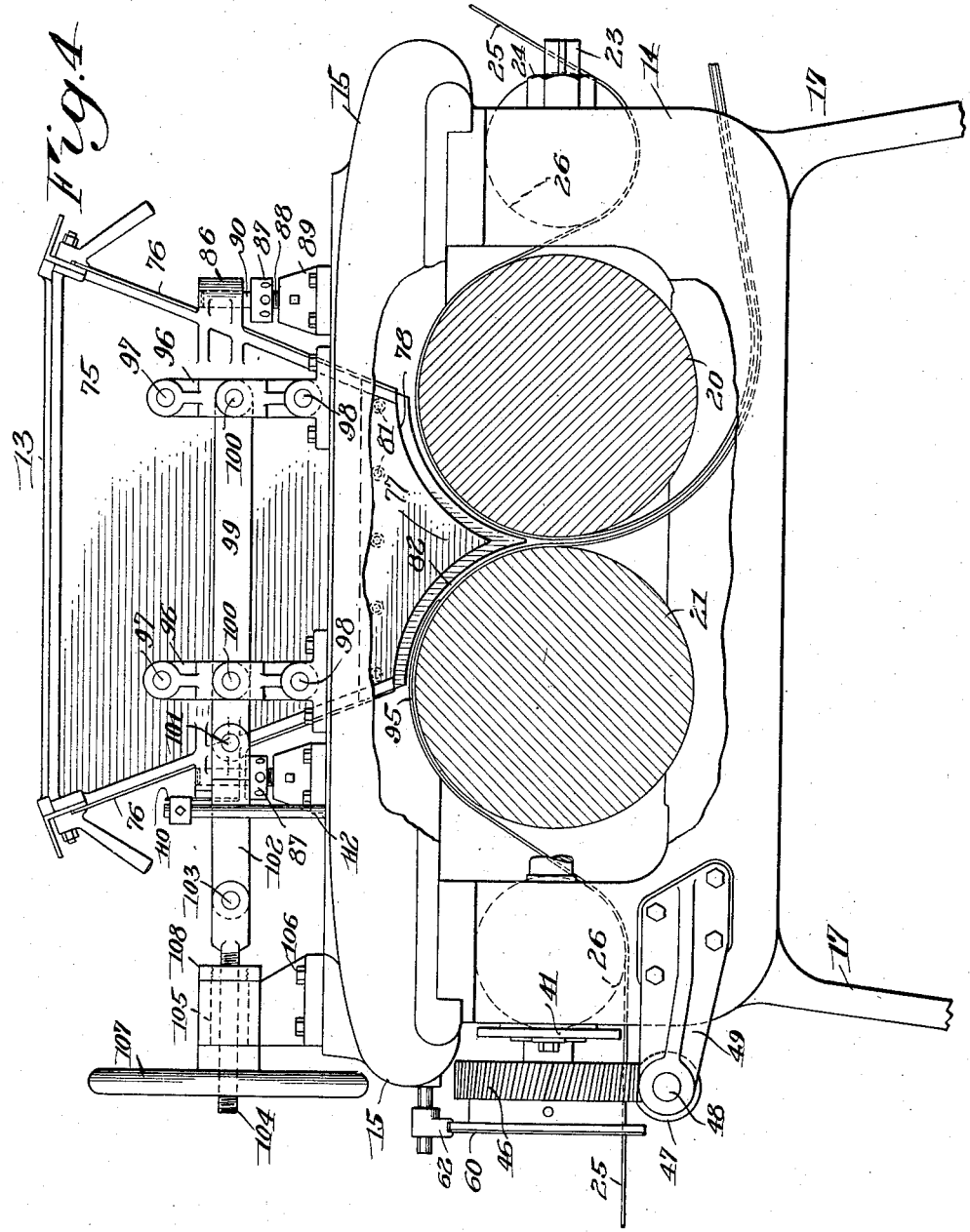
INVENTOR
Francis W. Harney
BY Edward H. Cumpston
his ATTORNEY INVENTOR
Francis W. Harney
BY Edward H. Cumpston
his ATTORNEY Patented June 30, 1931

1,812,631

UNITED STATES PATENT OFFICE

FRANCIS W. HARNEY, OF LOCKPORT, NEW YORK, ASSIGNOR TO THE UPSON COMPANY, OF LOCKPORT, NEW YORK, A CORPORATION OF NEW YORK

FORMING APPARATUS FOR PLASTIC MATERIALS

Application filed October 10, 1930. Serial No. 487,813.

This invention relates to an apparatus for making wallboard, and especially that class of wallboard in which a plastic filler is placed between suitable liners. An object of the invention is the provision of a generally improved and more satisfactory apparatus of this character, in which the amount of plastic filler which is fed between the liners may be accurately adjusted and controlled.
Another object of the invention is the provision of a machine in which the amount of plastic material fed between the liners may be varied for making boards of different thicknesses or densities.
Still another object is the provision of a machine comprising adjustable forming rolls, a movable hopper for supplying the material, and suitable indicating devices for indicating the positions of the rolls and of the hopper to assist in setting them.
A further object is the provision of a machine which permits splicing of the liners without disturbing the feeding and distribution of the plastic material.
To these and other ends the invention resides in certain improvements and combinations of parts, all as will be hereinafter more fully described, the novel features being pointed out in the claims at the end of the specification.

In the drawings:

Fig. 1 is a front elevation of an apparatus constructed according to a preferred embodiment of the invention;
Fig. 2 is an end view of the apparatus shown in Fig. 1 with the driving gears for the rolls removed, and the hopper in the lower operating position;

Fig. 3 is a vertical sectional view taken substantially on the lines 3—3 of Fig. 2 showing the location and the method of securing the guide plates to the end of the hopper;

Fig. 4 is a view similar to Fig. 2 with parts in section and parts broken away, showing the hopper in the raised position to permit the passage of a splice;

Fig. 7 is a fragmentary sectional view of the rolls and hopper showing the relation of the hopper and guide plates to the rolls, and

Fig. 8 is a view similar to Fig. 7 but with a wider spacing of the rolls illustrating the substitution of another interchangeable guide plate for the one shown in Fig. 7.

Figure 5:
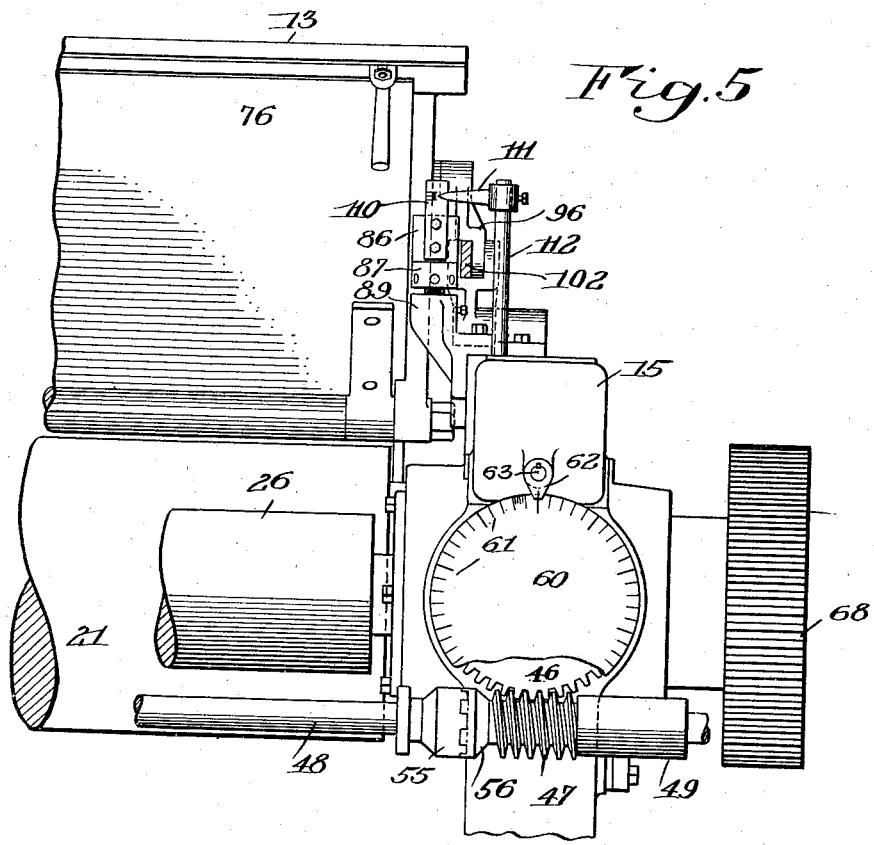
Fig. 5 is an enlarged fragmentary view of one end of the machine shown in Fig. 1, showing the indicating means for the rolls and for the hopper and a portion of the operating mechanism for moving one of the rolls.

Similar reference numerals throughout the several views indicate the same parts.

This invention relates to a machine for forming, for example, wallboard in which a plastic filler is placed between suitable liners, and comprises in general a frame 11, a pair of substantially parallel rolls 20 and 21 and a vertically movable hopper 13.

Each end of the machine is supported by the frame 11 which comprises a generally U-shaped member 14 and a top member 15 suitably secured to the U-shaped member. Guides 16 are provided on the U-shaped member and the top member for supporting and guiding the roll bearings in a manner hereinafter described. Suitable supporting legs 17 are provided on the U-shaped member.

The rolls comprise a stationary roll 20 and a movable or adjustable roll 21, the latter journalled in suitable bearings 22 and the former in bearings 22a, retained in and supported by the guides 16, as shown in Fig. 2. The bearings 22a of the stationary roll 20 are provided with means, such as rods 23 and nuts 24, for properly adjusting and aligning the roll in the machine during the course of erection. This adjustment having once been made, it ordinarily is not disturbed, and this roll 20 is therefore designated as the stationary or non-adjustable roll. The roll 21, which is called the movable or adjustable roll, is so disposed with relation to the roll 20 as to provide a space between the two rolls, as shown in Fig. 2. The purpose of such spacing is to permit the board forming materials to pass between the rolls in a manner hereinafter described. Suitable liners 25, such as paper or fabric, are led from suitable supply rolls so as to pass under guide rolls 26 and over the rolls 20 and 21, at which point plastic material such as a mixture of sodium silicate and a mineral filler, for example, is fed from the hopper and accurately disposed between the liners in a quantity suitable for the board being formed.

It is highly desirable in a machine of this type to provide means whereby the quantity of the plastic filler fed between the liners 25 can be varied so as to make boards suitable to different uses. It is evident from an inspection of Fig. 2 or Fig. 4 of the drawings that the quantity of filler disposed between the liners 25 depends upon the spacing of the rolls 20 and 21. In the present instance it is preferred to secure such a variation in spacing by making one of the rolls stationary and moving the other roll toward and away from the stationary roll, but it is to be clearly understood that, if desired, the variations in spacing may be secured by moving both rolls.

The bearing 22 of the movable roll 21 is provided with an extension 30 having a recess 31 therein in which a shaft 32 is rotatably secured for moving the roll 21 toward and away from the roll 20. The shaft 32 has a flange 33; and a ring 34, secured to the extension 30 of the bearing 22 by lag screws 35, engages the flange 33 to prevent outward movement thereof relative to the bearing 22. The inner end of the shaft 32 is slightly rounded as at 36, and engages a hardened bearing plate 37 secured in the bottom of the recess 31 in the bearing 22. The parts are so made that the end 36 of the shaft 32 is held in contact with the bearing plate 37 by the ring 34, so that there is no longitudinal lost motion of the shaft 32 relative to the bearing 22, but the shaft 32 is free to rotate relative to the bearing.

The shaft 32 extends horizontally through a bushing 38 which is provided with an aperture centrally thereof, a portion of which is threaded to engage the threaded portion 39 of the shaft 32. This bushing is disposed in an opening in the U-shaped member 14 and is held against movement in one direction by a shoulder 40 on the bushing which engages a corresponding shoulder in the opening. Movement of the bushing in the other direction is prevented by a nut 41 threaded on the bushing which contacts with the member 14 and thus securely locks the bushing in place. A worm wheel 46 is secured to the shaft 32 on the outer end thereof, and meshes with a worm 47 rotatable on the shaft 48 and held against movement in one direction on the shaft 48 by contacting with the shaft bearing 49 which is a bracket secured to the frame 14, while movement in the other direction is prevented by any suitable means. The shaft 48 is provided with a hand wheel 50 by which it may be conveniently rotated.

The worm 47 is provided with an integral clutch jaw 56 which engages a corresponding jaw 55 splined on the shaft 48 so that upon rotation of the jaw 55 by the rotation of the shaft 48, the jaw 56 and worm 47 are caused to rotate. The adjustable roll 21 has a bearing 22 at each end, as above mentioned, and an adjusting screw 32, a worm wheel 46, and a worm 47 are provided in connection with each bearing 22. One worm 47 is near the right hand end of the shaft 48 and the other worm is near the left hand end thereof, as shown in Fig. 1. Hence when the clutches connecting the two worms to the shaft 48 are both closed, the hand wheel 50 may be operated to move both ends of the roll 21 simultaneously and through the same distance toward or away from the other roll 20.

At times it may be desired to move one end of the roll 21 toward or away from the roll 20 without moving the other end, as for example when it is desired to adjust them to a non-parallel relation, or from such a relation back to a parallel relation. This may be accomplished by sliding one of the movable clutch jaws 55 along the shaft 48 out of engagement with its cooperating clutch jaw 56, while leaving the other clutch jaws in normal closed position. Rotation of the hand wheel 50 will then result in moving one end of the roll 21, leaving the other end thereof stationary.

Figure 6:
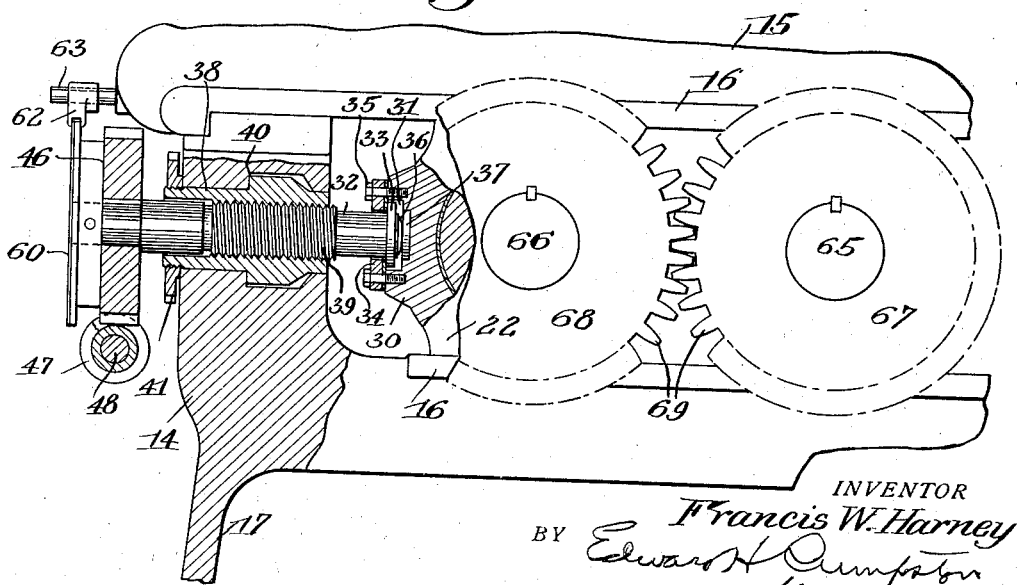
Fig. 6 is an end view of the lower portion of the machine with parts in section and parts broken away, showing the mechanism for moving one of the rolls.

It is obvious, of course, that rotation of the shaft 32 by means of the worm 47 and worm wheel 46 will cause the shaft to move longitudinally due to the screw threads 39, and it is this longitudinal movement of the shaft, transmitted to the bearing 22, which adjusts the position of the bearing and of the roll 21. Since the worm wheel 46 is fixed to the shaft 32, it will move longitudinally therewith, or in a direction transverse to the axis of its worm 47. On this account, the worm wheel has a relatively wide face, as illustrated in Fig. 6, so that it will mesh properly with the worm in any position to which the shaft 32 is shifted, and the cooperating teeth on the worm and the worm wheel are made of such shape as to permit the transverse movement of the worm wheel across the axis of the worm, without interfering with the meshing of the gears.

It is desirable to provide indicating means to indicate the spacing of the two rolls and preferably this indicating means comprises a separate indicating device for showing the spacing of each end of one roll from the other roll. A sensitive micrometer indicating device may conveniently be formed by providing a plate 60 on the outer end of each shaft 32, which plate has scale graduations 61 extending around the periphery thereof and cooperating with an index or pointer 62 splined to the shaft 63 so that the pointer may move along the shaft in conjunction with the movement of the disk 60 as the shaft 32 moves longitudinally. The pointer 62 has a recess into which the periphery of the disk 60 fits so that the axial movements of the disk will move the pointer along the shaft 63. Complete rotations of the shaft 32 may be indicated by suitable graduations on the shaft 63 and partial rotations of the shaft 32 are read by the scale markings 61 in cooperation with the pointer 62.

This arrangement of an indicating disk 60 and a pointer 62 is provided in conjunction with each of the two adjusting screws 32, so that a separate indicating device is provided in conjunction with each end of the adjustable roll. These indicating devices are extremely sensitive and will show accurately the spacing of each end of the rolls so that the rolls may be accurately and easily set in a truly parallel position or in any other relation desired.

The rolls 20 and 21 are provided with shafts 65 and 66 respectively, which are supported in and extend beyond the bearings 22 and 22a. Gears 67 and 68 are keyed to these shafts for rotating the rolls. Referring to Fig. 6 it will be noted that the teeth 69 on these gears are relatively long so that the gears will mesh with each other at all spacings of the rolls 20 and 21. Suitable driving means, not shown, is provided for operating the gears to rotate the rolls.

A hopper 13 is provided for holding a supply of plastic material and feeding it into the space between the liners 25. The hopper comprises ends 75 and sides 76. Each end 75 tapers downwardly and terminates in a generally triangular shaped portion 77 having concave edges 78 which are slightly spaced from the surface of the rolls, the apex of the triangular portion extending downwardly into the space between the rolls, as shown in Fig. 4.

It is desirable in a machine of this type to distribute the plastic filler the full width of the liner, and at the same time to reduce to a minimum the amount of filler which squeezes or oozes out between the hopper and the liners. In order to reduce such oozing out of the material, it is desirable that the distance between the end portions 77 of the hopper and the rolls be small so that there is just sufficient space for the liners to pass without rubbing on the hopper. It is evident from Figs. 7 and 8, which show different spacings of the rolls, that the distance between the movable roll 21 and the corresponding edge 78 of the hopper will vary at different spacings of the rolls, so that it is difficult to maintain a tight seal between the hopper and this movable roll, when the roll is moved from one position to another. To assist in maintaining such a seal and preventing the plastic material from oozing out, the ends 75 of the hopper are provided with extensions in the form of removable and interchangeable plates 79 which are shaped to fit relatively closely against the liners 25 without actually scraping upon them. When the spacing of the rolls is changed slightly, or when thicker or thinner liners are to be used, the position of the hopper may be shifted by mechanism to be described later, to accommodate the edges of the plates 79 to the new position of the rolls or the new thickness of the liners. When the rolls are adjusted through any considerable extent, however, the plates 79 are removed and replaced by another set of plates of slightly different shape, which will fit more closely against the rolls in their new spacing.

Fig. 3 shows a section of one of the hopper ends and the relation of the plate 79 thereto. The inner surface of the lower portion of the end 75 is cut away as at 80, Fig. 3, so that when the plate 79 is secured therein, a smooth surface is presented which will not obstruct the flow of plastic material downwardly into the space between the rolls. This plate may be secured to the end 75 by any suitable means which will enable it to be readily removed. In the present instance it is shown as being held by screws 81 which are countersunk in the plate 75. This plate is generally triangular in shape similar to the portion 77 of the hopper end and has edges 82 which conform closely to the faces of the rolls, allowing just sufficient space between the edges 82 and the rolls 20 and 21 for the liners to pass freely. The apex of the plate extends downwardly into the space between the rolls as far as practicable toward the plane of the axes of the rolls, to prevent lateral spreading of the plastic material.

The plates shown in Figs. 2 and 7 are suitable for comparatively narrow spacing of the rolls and when the rolls are adjusted to a comparatively wide spacing these plates are removed and replaced by plates such as shown in Fig. 8. Other sets of plates may be used for other roll spacings. Small variations in roll spacings can be made without the necessity of changing the plates 79, the hopper being adjusted, as pointed out later, to keep the edges of the plates close to the rolls.

Where it is desired to be able to vary the width of the mass of plastic material fed between the rolls, the plates 79 may be secured to movable end members within the hopper, which members are adjustable in a direction longitudinally of the forming rolls 20 and 21.

As stated above, the spacing between the plates 79 and the rolls is sufficient to allow the liners to freely pass therebetween. However in the manufacture of wallboards for different uses, liners of various thicknesses are employed so that the distance between the plates 79 and the rolls should be adjustable to accommodate these various liners. To accomplish this result and to accommodate the hopper to slight adjustments of the rolls, the vertically movable hopper 13 is provided with lugs 86 which engage stops 87 for supporting and limiting the downward movement of the hopper. Each stop is formed on a vertical threaded spindle 88 which engages a threaded opening in the bracket 89 on the member 15. By rotating the stop 87 and its spindle 88, the elevation of the stop may be changed and the position of the hopper may thus be adjusted to vary the space between the plates 79 and the rolls to accommodate various thicknesses of liners as well as small variations in roll spacing as stated above. The spindle 88 of the stop 87 is provided with an upwardly extending portion 90 which projects into an aperture in the lug 86 and thus guides the hopper when it is raised or lowered by mechanism to be described hereafter.

In the manufacture of wallboard it is occasionally desirable to make a splice in the liners, such a splice being shown at 95 on the top of roll 21 in Fig. 4. It is evident from what has been said, that such a liner, due to the increased thickness resulting from the splice, will not easily pass through the restricted space between the plates 79 and the roll. It is, therefore, advantageous to provide means whereby the entire hopper can be raised to allow the splice to pass, the hopper being subsequently lowered to its original position as shown in Fig. 2.

While under some circumstances the raising of the hopper may be accomplished by rotating the stops 87 to raise them by the action of the screw threads, yet it is preferred to provide a more convenient and easy means for raising the hopper, such as a pair of toggle links 96 associated with each end of the hopper and having one end of each link pivoted at 97 to the end portion 75 of the hopper and the other end of the link pivoted at 98 to a bracket on the member 15, as shown in Figs. 2 and 4. A horizontal arm 99 is connected to these toggle links at the intermediate pivot point 100. In normal operation the toggle links are in some such position as shown in Fig. 2 so that the weight of the hopper rests upon the stops 87. When a splice is to pass over a roll, however, the arm 99 is moved horizontally to tend to straighten the toggle links, which then assume some such position as shown in Fig. 4, thus lifting the hopper an amount sufficient to allow the splice to pass between the plates 79 and the rolls. After the splice has passed, the arm 99 is moved horizontally in the opposite direction, the toggle and hopper returning to the position shown in Fig. 2.

The arm 99 is pivoted at 101 to an intermediate link 102 the other end of which is pivoted at 103 to a threaded member 104. This threaded member passes through and engages a correspondingly threaded portion in a sleeve 105 rotatable in a bearing bracket 106 suitably mounted on the frame 15, and held against longitudinal movement therein by a shoulder on the sleeve engaging one end of the bearing bracket and a nut 108 on the sleeve engaging the other end of the bracket. A hand wheel 107 is secured to the sleeve 105 so that upon the rotation of the hand wheel the sleeve 105 is caused to rotate in the bracket 106 and thus acts as a nut on the threaded member 104, and moves the arm 99 in one direction or the other depending on the direction of rotation, which moves the toggle links 96 and raises or lowers the hopper.

The spacing between the plates 79 and the rolls may be indicated on scales 110, one secured to and movable with a lug 86 at each end of the hopper. Stationary pointers 111 secured to vertical rods 112 on the member 15 register with the scales 110 and designate the position of each end of the hopper. These scales are used to indicate the amount the hopper has been moved to accommodate liners of different thicknesses or to permit the passage of a splice. The exact position of the hopper is thus always clearly indicated, and the scales 110 may be used in conjunction with the indicators 60 to determine the proper position of the hopper for a given spacing of the rolls.

While one embodiment of the invention has been disclosed, it is to be understood that the inventive idea may be carried out in a number of ways. This application is therefore not to be limited to the precise details disclosed but is intended to cover all variations and modifications thereof falling within the spirit of the invention or the scope of the appended claims.

I claim:

1. Mechanism for forming wallboard and the like comprising a pair of substantially parallel rolls, means for supplying plastic material to the space between said rolls, screw means associated with each end of one of said rolls to move said roll toward and away from the axis of the other of said rolls, mechanism for operating each of said screw means independently to move each end of one of said rolls independently of the other end, and mechanism for operating both of said screw means simultaneously to shift both ends of said one of said rolls simultaneously toward and away from the axis of the other of said rolls.

2. Mechanism for forming wallboard and the like comprising a pair of substantially parallel rolls, means for supplying plastic material to the space between said rolls, screw means for moving one end of one of said rolls toward and away from the axis of the other of said rolls, a gear for rotating said screw means, said gear being mounted on said screw means to move longitudinally therewith, and a second gear meshing with said first named gear to rotate the latter to operate said screw means, said gears having teeth thereon so formed relative to each other as to permit said first named gear to move longitudinally relative to said second gear in response to longitudinal movement of said screw means.

3. Mechanism for forming wallboard and the like comprising a pair of substantially parallel rolls, means for supplying plastic material to the space between said rolls, screw means for moving one end of one of said rolls, a worm wheel for rotating said screw means, said worm wheel being mounted on said screw means to move longitudinally therewith, and a worm meshing with said worm wheel to rotate the latter to operate said screw means, said worm and worm wheel having teeth thereon so formed relative to each other as to permit said worm wheel to move in a direction transverse to the axis of said worm in response to longitudinal movement of said screw means.

4. Mechanism for forming wallboard and the like comprising a pair of substantially parallel rolls, means for supplying plastic material to the space between said rolls, means for moving each end of one of said rolls independently toward and away from the axis of the other of said rolls to vary the spacing between said rolls, and indicating means associated with each end of the movable roll to indicate the spacing of said rolls.

5. Mechanism for forming wallboard and the like comprising a pair of substantially parallel rolls, means for supplying plastic material to the space between said rolls, screw means associated with each end of one of said rolls to move said roll toward and away from the axis of the other of said rolls, and micrometer indicating means secured to and rotatable with said screw means to indicate the spacing between the rolls.

6. Mechanism for forming wallboard and the like comprising a pair of substantially parallel rolls, means for moving the ends of one of said rolls independently toward and away from the axis of the other of said rolls to vary the spacing between said rolls, a hopper mounted above said rolls to supply plastic material to the space between the rolls, and means for moving said hopper toward and away from said rolls.

7. Mechanism for forming wallboard and the like comprising a pair of substantially parallel rolls, means for moving the ends of one of said rolls toward and away from the axis of the other of said rolls to vary the spacing between said rolls, a hopper mounted above said rolls to supply plastic material to the space between the rolls, means for moving said hopper, and adjustable stop means for limiting the motion of the hopper in a direction toward the rolls.

8. Mechanism for forming wallboard and the like comprising a pair of substantially parallel rolls, means for moving the ends of one of said rolls toward and away from the axis of the other of said rolls to vary the spacing between said rolls, a vertically movable hopper mounted above said rolls, abutment portions on said hopper, means for moving said hopper toward and away from said rolls, and adjustable stop means contacting with said abutment portions for limiting the downward movement of said hopper.

9. A machine for the manufacture of wallboard and the like comprising a frame, a hopper movable relative to said frame, a lug on said hopper, said lug having an aperture therein, means for moving said hopper relative to said frame, and stop means for limiting the movement of said hopper, said stop means including a screw portion mounted on said frame, an abutment portion contacting with said lug for limiting the movement of said hopper, and a guide portion extending into said aperture for guiding said hopper during movement thereof.

10. A machine for the manufacture of wallboard and the like comprising a frame, a hopper movably mounted on said frame, a toggle link having one end connected to said hopper and the other end connected to said frame, and means for operating said toggle link to move said hopper.

11. A machine for the manufacture of wallboard and the like comprising a frame, a hopper movably mounted on said frame, means for independently lifting each end of said hopper, and means associated with said hopper for limiting the movement thereof.

12. A machine for the manufacture of wallboard and the like comprising a frame, a hopper movably mounted on said frame, means for independently lifting each end of said hopper, said means including a toggle having one end thereof secured to said frame and the other end connected to said hopper, means for operating said toggle for lifting said hopper, and means independent of said lifting means for limiting the downward movement of said hopper.

13. A machine for the manufacture of wallboard and the like comprising a frame, a hopper movably mounted on said frame, means for independently lifting each end of said hopper, said means including a toggle having one end thereof secured to said frame and the other end connected to said hopper, an operating member secured to said toggle intermediate the ends thereof, said member having a threaded portion, threaded means cooperating with said threaded portion to move said member to operate said toggle, and stop means independent of said lifting means for limiting the downward movement of said hopper.

14. A machine for the manufacture of wallboard and the like comprising a frame, a movable hopper on said frame, lifting means associated with said hopper for lifting said hopper, stop means associated with said hopper and independent of said lifting means for limiting the downward movement of the hopper, and indicating means for independently indicating the position of each end of said hopper.

15. A machine for the manufacture of wallboard and the like comprising a pair of substantially parallel rolls, means for moving one of said rolls toward and away from the other of said rolls, and a hopper mounted above said rolls for supplying plastic material to the space between said rolls, said hopper having a portion extending into the space between said rolls, said portion being removable and replaceable by another portion of different shape when said rolls are set to a different spacing.

16. A machine for the manufacture of wallboard and the like comprising a pair of substantially parallel rolls, means for moving one of said rolls toward and away from the other of said rolls, a hopper mounted above said rolls for supplying plastic material to the space between said rolls, and a removable and replaceable section mounted on said hopper and extending into the space between said rolls to limit spreading of said plastic material.

17. A machine for the manufacture of wallboard and the like comprising a pair of substantially parallel rolls, means for moving one of said rolls toward and away from the other of said rolls to vary the spacing between said rolls, a hopper mounted above said rolls for supplying plastic material to the space between said rolls, and a plurality of removable and interchangeable plates for attachment to said hopper to extend into the space between said rolls to limit spreading of said plastic material, said plates being generally triangular in shape and having concave edges, said edges on certain of said plates being non-symmetrical about the center lines of such plates.

18. A machine for the manufacture of wallboard and the like, comprising a pair of substantially parallel rolls, means for moving both ends of one of said rolls toward and away from the other of said rolls to vary the spacing of said rolls, a movable hopper mounted adjacent said rolls for supplying plastic material to the space between said rolls, and means for moving said hopper to compensate for different spacing of said rolls.

19. A machine for the manufacture of wallboard and the like comprising a frame, a pair of substantially parallel rolls mounted on said frame, means for moving one of said rolls toward and away from the other of said rolls to vary the spacing between them, an indicating device for indicating the spacing of said rolls, a movable hopper mounted adjacent said rolls for supplying plastic material to the space between said rolls, means for moving said hopper to compensate for different spacing of said rolls, and an indicating device for indicating the position of said hopper.

20. Mechanism for forming wallboard and the like comprising a pair of substantially parallel rolls, means for moving each end of one of said rolls independently toward and away from the other of said rolls, a separate indicating device associated with each end of said movable roll for indicating the position of each end of said roll, a movable hopper mounted adjacent said rolls for supplying plastic material to the space between them, and separate indicating mechanism associated with each end of said hopper for indicating the position of each end of said hopper.

FRANCIS W. HARNEY.